(12) United States Patent
Huang et al.

(10) Patent No.: US 11,589,446 B2
(45) Date of Patent: Feb. 21, 2023

(54) LIGHT CONTROL METHOD AND APPARATUS, AND STORAGE MEDIUM

(71) Applicant: Glowworm (Shenzhen) Lighting Technology Co., Ltd., Shenzhen (CN)

(72) Inventors: Mingxu Huang, Shenzhen (CN); Tianfei Zhou, Shenzhen (CN); Jiancan Chen, Shenzhen (CN); Fuzhi Zheng, Shenzhen (CN)

(73) Assignee: GLOWWORM (SHENZHEN) LIGHTING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/643,566

(22) Filed: Dec. 9, 2021

(65) Prior Publication Data

US 2022/0191994 A1   Jun. 16, 2022

(30) Foreign Application Priority Data

Dec. 11, 2020 (CN) .......................... 202011445313.X
Aug. 10, 2021 (CN) .......................... 202110915169.X

(51) Int. Cl.
*H05B 47/165* (2020.01)
*H05B 45/20* (2020.01)
(Continued)

(52) U.S. Cl.
CPC ......... *H05B 47/165* (2020.01); *H04N 19/172* (2014.11); *H04N 19/186* (2014.11);
(Continued)

(58) Field of Classification Search
CPC .. H05B 47/165; H05B 47/105; H05B 47/125; H05B 47/17; H05B 47/18; H05B 47/19; H05B 45/14; H05B 45/20; H05B 45/50; H05B 45/30; H04B 19/186; H04B 19/44; F21S 4/24; F21V 33/0052; Y02B 20/40
See application file for complete search history.

(56) References Cited

U.S. PATENT DOCUMENTS

| 2013/0294050 A1 | 11/2013 | Lee et al. |
| 2017/0265279 A1* | 9/2017 | Chraibi ................ H05B 47/115 |
| 2020/0214102 A1* | 7/2020 | Laman ................... H04N 9/646 |

FOREIGN PATENT DOCUMENTS

| CN | 105450965 A * | 3/2016 | ............... G06F 3/14 |
| CN | 106341929 A | 1/2017 | |

(Continued)

OTHER PUBLICATIONS

Machine Translation of CN105450965A (Year: 2016).*

(Continued)

*Primary Examiner* — Raymond R Chai
(74) *Attorney, Agent, or Firm* — M&B IP Analysts, LLC

(57) ABSTRACT

A light control method and apparatus, and a storage medium are disclosed. The light control method includes: acquiring video data information from the video source device; obtaining color data information of pixels in a preset region in a frame picture according to the video data information; generating a corresponding light control signal according to the color data information; and outputting the light control signal to a lamp bank to control an operating state of the lamp bank to match the video data information.

9 Claims, 11 Drawing Sheets

(51) Int. Cl.
　　　*H05B 47/17*　　　(2020.01)
　　　*H05B 47/105*　　　(2020.01)
　　　*H04N 19/172*　　　(2014.01)
　　　*H04N 19/186*　　　(2014.01)
　　　*H04N 19/44*　　　(2014.01)
　　　*H05B 47/125*　　　(2020.01)
　　　*H05B 47/18*　　　(2020.01)
　　　*H05B 45/50*　　　(2022.01)
　　　*H05B 45/14*　　　(2020.01)
　　　*F21S 4/24*　　　(2016.01)
　　　*F21Y 115/10*　　　(2016.01)
　　　*F21V 33/00*　　　(2006.01)

(52) U.S. Cl.
　　　CPC .............. *H04N 19/44* (2014.11); *H05B 45/14* (2020.01); *H05B 45/20* (2020.01); *H05B 45/50* (2020.01); *H05B 47/105* (2020.01); *H05B 47/125* (2020.01); *H05B 47/17* (2020.01); *H05B 47/18* (2020.01); *F21S 4/24* (2016.01); *F21V 33/0052* (2013.01); *F21Y 2115/10* (2016.08)

(56) References Cited

FOREIGN PATENT DOCUMENTS

| | | |
|---|---|---|
| CN | 210328082 U | 4/2020 |
| CN | 111867179 A | 10/2020 |
| WO | 2017219522 A1 | 12/2017 |

OTHER PUBLICATIONS

International Search Report for PCT/CN2021/077129, CNIPA, dated Sep. 13, 2021.

Written Opinion of the International Searching Authority for PCT/CN2021/077129, CNIPA, dated Sep. 13, 2021.

* cited by examiner

LIGHT CONTROL METHOD AND APPARATUS, AND STORAGE MEDIUM

CROSS-REFERENCE TO RELATED APPLICATIONS

This application is based on and claims the benefit of priority from Chinese Patent Applications No. 202110915169X filed on 10 Aug. 2021 and No. 202011445313X filed on 11 Dec. 2020. The contents of these applications are incorporated herein by reference in their entirety.

TECHNICAL FIELD

Embodiments of the present application relate to the technical field of light control, and more particularly, to a light control method and apparatus, and a storage medium.

BACKGROUND

With the increasing of people's living standard, lighting devices have been widely used. For example, people can set their favorite scenario and circumstance lighting effects according to their own lighting needs (such as color, temperature, brightness and direction, or the like), and select and control the changes of brightness, gray scale and color of light in different spaces and times according to their own requirements and scenario conditions.

At present, the control mode of the lighting devices lacks flexibility and adaptability, which cannot be close to the needs of scenarios, thus leading to poor user experience.

SUMMARY

The following is a summary of the subject detailed herein. This summary is not intended to limit the protection scope of the claims.

Embodiments of the present application provide a light control method and apparatus, and a storage medium, which are capable of effectively improving flexibility and adaptability of a control mode of a lighting device.

In a first aspect, the present application provides a light control method applied to a light controller, wherein the light controller is in communication with a video source device and a lamp bank respectively, and the device includes:

acquiring video data information from the video source device;

obtaining color data information of pixels in a preset region in a frame picture according to the video data information;

generating a corresponding light control signal according to the color data information; and outputting the light control signal to the lamp bank to control an operating state of the lamp bank to match the video data information.

In a second aspect, the present application further provides a light control apparatus applied to a light controller, wherein the light controller is in communication with a video source device and a lamp bank respectively, and the apparatus includes:

a video information acquisition module, configured for acquiring video data information from the video source device;

a color information calculation module, configured for obtaining color data information of pixels in a preset region in a frame picture according to the video data information;

a control signal generation module, configured for generating a corresponding light control signal according to the color data information; and an output module, configured for outputting the light control signal to the lamp bank to control an operating state of the lamp bank to match the video data information.

In a third aspect, the present application further provides a computer-readable storage medium storing a computer-executable instruction, wherein the program instruction, when executed by a processor, implements the light control method according to the first aspect.

Compared with the prior art, according to the light control method according to the embodiment of the present application in the first aspect, the video data information from the video source device is acquired, and the corresponding light control signal is generated according to the video data information to control the operating state of the lamp bank to match the video data information, so that the operating state of the lamp bank changes with the change of the video data information, thereby improving the flexibility and the adaptability of the control mode of the lighting device and improving the user experience.

It may be understood that, the beneficial effects of the second aspect to the third aspect in comparison to the prior art are the same as the beneficial effects of the first aspect in comparison to the prior art, which may be referred to the related description in the first aspect and will not be repeated here.

DETAILED DESCRIPTION

Figure 1:
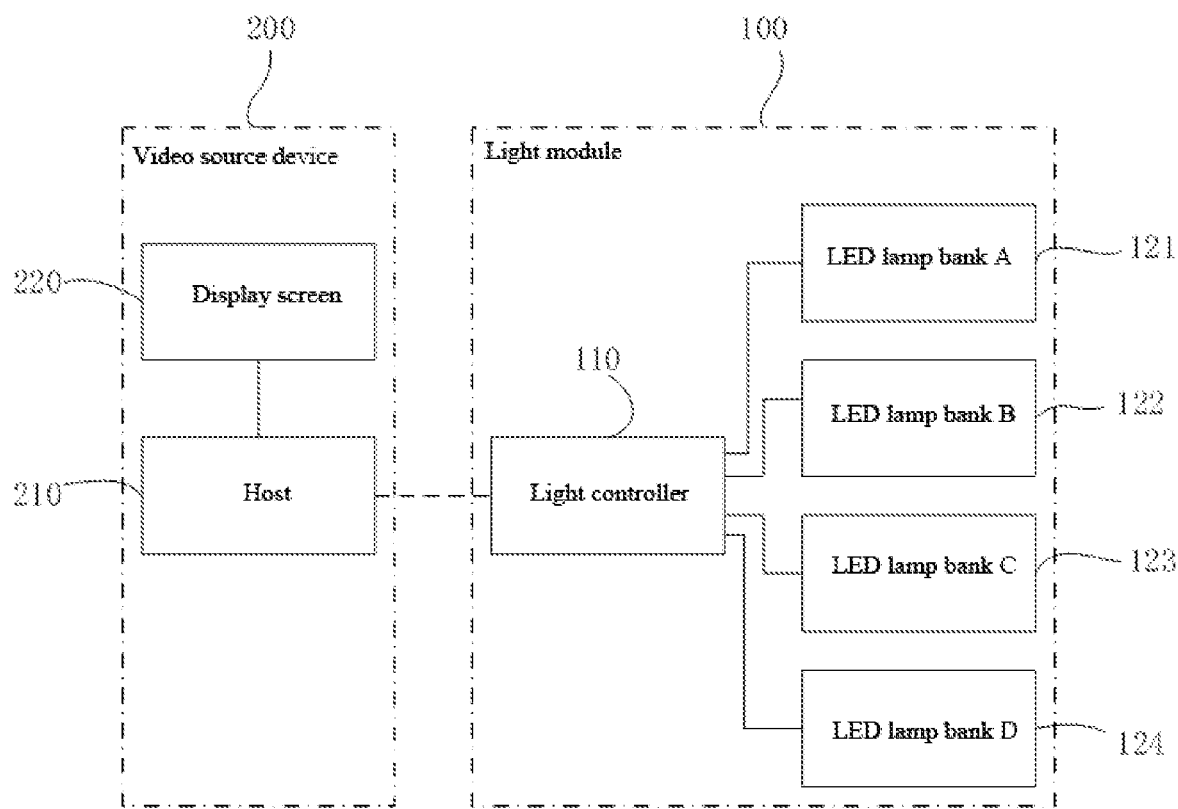
FIG. 1 is a schematic diagram of a system architecture for executing a light control method according to an embodiment of the present application.

In the following description, specific details, such as specific module structure and technology, are put forward for illustration rather than limitation, so as to thoroughly understand the embodiments of the present application. However, it should be clear to those having ordinary skill in the art that the embodiments of the present application can be practiced in other embodiments without these specific details. In other cases, detailed descriptions of well-known modules, devices, circuits and methods are omitted so as not to hinder the description of the embodiments of the present application with unnecessary details.

It should be noted that, although a logical sequence is shown in the flowchart, in some cases, the steps shown or described may be executed in a sequence different from the flowchart. The terms "first", "second" and the like in the specification and claims as well as the above drawings are used to distinguish similar objects, and are not necessarily used to describe a specific sequence or a chronological order.

It should also be understood that the reference to "one embodiment" or "some embodiments" described in the specification of the embodiments of the present application means that the specific features, structures or characteristics described in connection with this embodiment are included in one or more of the embodiments of the present application. Therefore, the phrases "in one embodiment", "in some embodiments", "in some other embodiments" and "in some another embodiments" appearing in different places in this specification do not necessarily all refer to the same embodiment, but mean "one or more but not all embodiments" unless otherwise specially emphasized. The terms "comprising", "containing", "having" and their variants all mean "including but not limited to" unless otherwise specifically emphasized.

With the increasing of people's living standard, lighting devices have been widely used due to simple control thereof. People can set their favorite scenario and circumstance lighting effects according to their own lighting needs (such as color, temperature, brightness and direction, or the like), and select and control the changes of brightness, gray scale and color of light in different spaces and times according to their own requirements and scenario conditions.

At present, the control mode of the lighting devices lacks flexibility and adaptability, which cannot be close to the needs of scenarios, thus leading to poor user experience.

Based on this, the embodiments of the present application provide a light control method and apparatus, and a storage medium, which acquires video data information from a video source device, and generates a corresponding light control signal according to the video data information to control a operating state of a lamp bank to match the video data information, so that the operating state of the lamp bank changes with the change of the video data information, thereby improving flexibility and adaptability of a control mode of a lighting device and improving the user experience.

The embodiments of the present application are further described below with reference to the accompanying drawings.

As shown in FIG. 1, FIG. 1 is a schematic diagram of a system architecture of a light control method according to an embodiment of the present application. In the example of FIG. 1, the system architecture includes a video source device 200 and a light module 100, and the video source device 200 is in communication with the light module 100.

Figure 2:
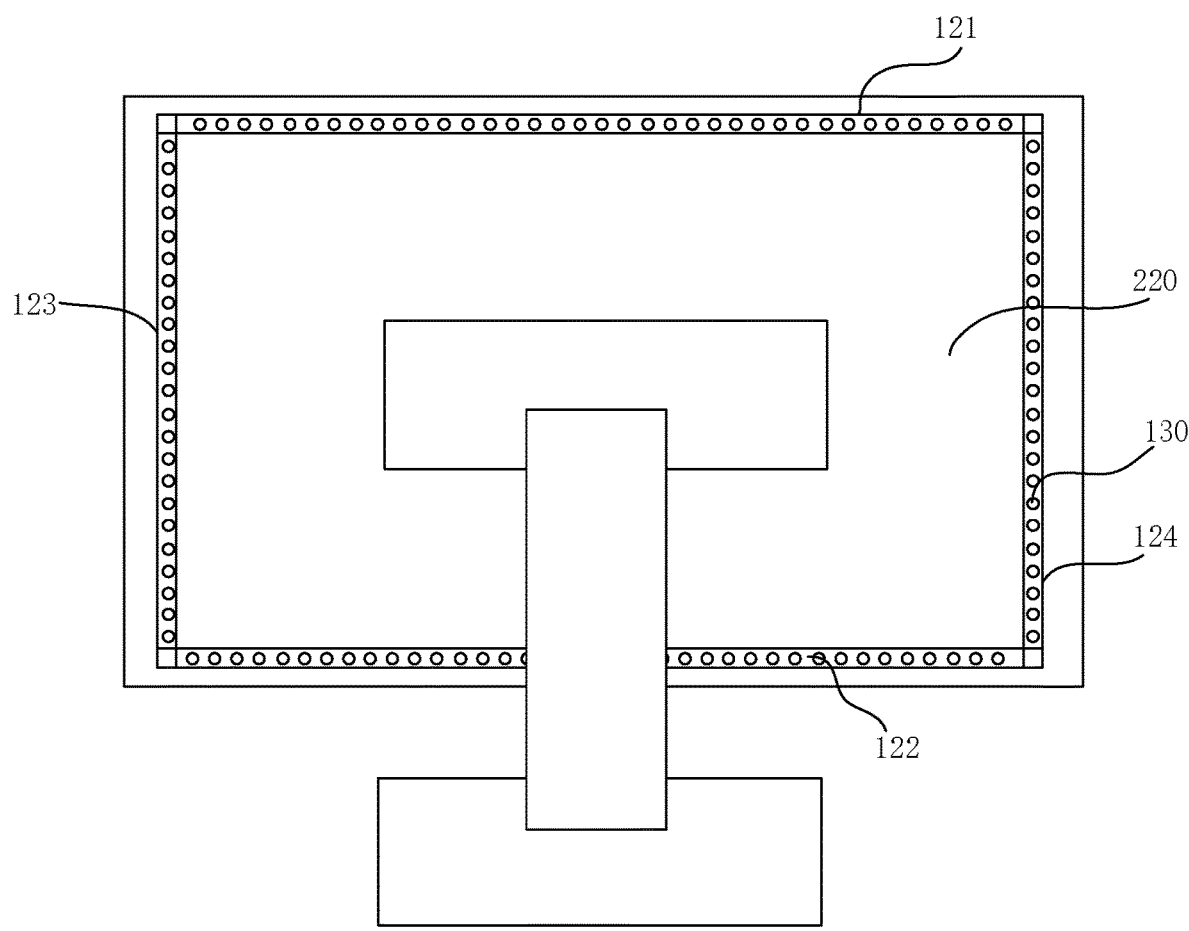
FIG. 2 is a structural schematic diagram of a back of a display screen on which a lamp bank is installed, according to an embodiment of the present application.
Figure 4:
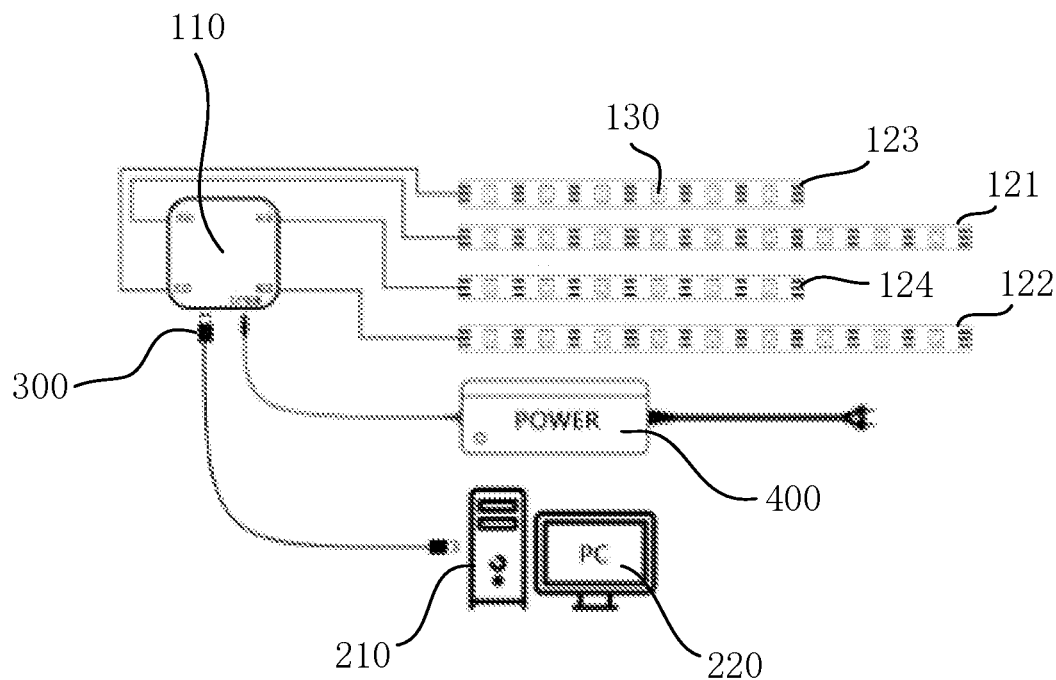
FIG. 4 is a schematic diagram of a system architecture of a light control system according to an embodiment of the present application.

The video source device 200 may be a mobile terminal device or a non-mobile terminal device. The mobile terminal device may be a mobile phone, a tablet computer, a notebook computer, a handheld computer, a vehicle-mounted terminal device, a wearable device, a super mobile personal computer, a netbook, a personal digital assistant, or the like. The non-mobile terminal device may be a personal computer, a TV set, a set top box, a teller machine or a self-service machine, and the like. The embodiments of the present invention are not particularly limited. Referring to FIG. 1, FIG. 2 and FIG. 4, the following description will take the video source device 200 being a personal computer as an example. The personal computer includes a host 210 and a display screen 220 in communication with the host 210.

The light module 100 includes a light controller 110 and at least one lamp bank. The light controller 110 is in communication with the lamp bank by wired or wireless means.

As for the light controller 110, the light controller 110 is configured for being in communication with the video source device 200 and executing the light control method. In some embodiments, the light controller 110 includes a video information acquisition module, a color information calculation module, a control signal generation module and an output module. The video information acquisition module is configured for acquiring video data information from the video source device; the color information calculation module is configured for obtaining color data information of pixels in a preset region in a frame picture according to the video data information; the control signal generation module is configured for generating a corresponding light control signal according to the color data information; and the output module is configured for outputting the light control signal to the lamp bank to control an operating state of the lamp bank to match the video data information.

The lamp bank is in communication with the light controller 110. The lamp bank may be an LED lamp bank 121/122/123/124 or other multi-color lamp bank, such as an OLED lamp bank. The lamp bank may include a plurality of lamp beads. For example, when the lamp bank is the LED lamp bank 121/122/123/124, the LED lamp bank includes a plurality of smart integrated LED light sources (lamp beads) sequentially connected in series. The following various embodiments will only be described by taking the LED lamp bank 121/122/123/124 as an example. In some embodiments, the lamp bank includes a plurality of lamp beads. The plurality of lamp beads may be in communication with the light controller 110 respectively, that is, the plurality of lamp beads are connected in parallel.

In some embodiments, the LED lamp bank is positioned to be matched with a display picture of a display screen 220 of the video source device 200, so that a bright color state (operating state) of the LED lamp bank can match a display picture content of the display screen. For example, the LED lamp bank may be LED lamp strip 121/122/123/124, which is respectively arranged on a back (as shown in FIG. 2) or a side face of the display screen 220 of the video source device 200. For another example, the plurality of LED lamp banks are correspondingly arranged on four sides of the display screen facing a ceiling/floor/wall of a living room/cinema respectively. For another example, the LED lamp bank may be a vertical lamp bank, which is correspondingly arranged on two sides of the display screen respectively.

The system architectures and the application scenarios described in the embodiments of the present application are only for the purpose of more clearly explaining the technical solutions of the present application and do not constitute a limitation to the technical solutions according to the present application. Those of ordinary skill in the art may know that with the evolution of the system architectures and the emergence of new application scenarios, the technical solutions according to the embodiments of the present application are also applicable to similar technical problems.

Those having ordinary skill in the art can understand that the system architecture shown in FIG. 1 does not constitute a limitation to the embodiments of the present application, and may include more or less components than the illustrated components, or combine some components, or have different component arrangements.

In the system architecture shown in FIG. 1, the light controller may call a light control program stored thereon to execute the light control method.

On the basis of the above-mentioned system architecture, various embodiments of the light control method according to the embodiments of the present application are proposed.

Figure 3:
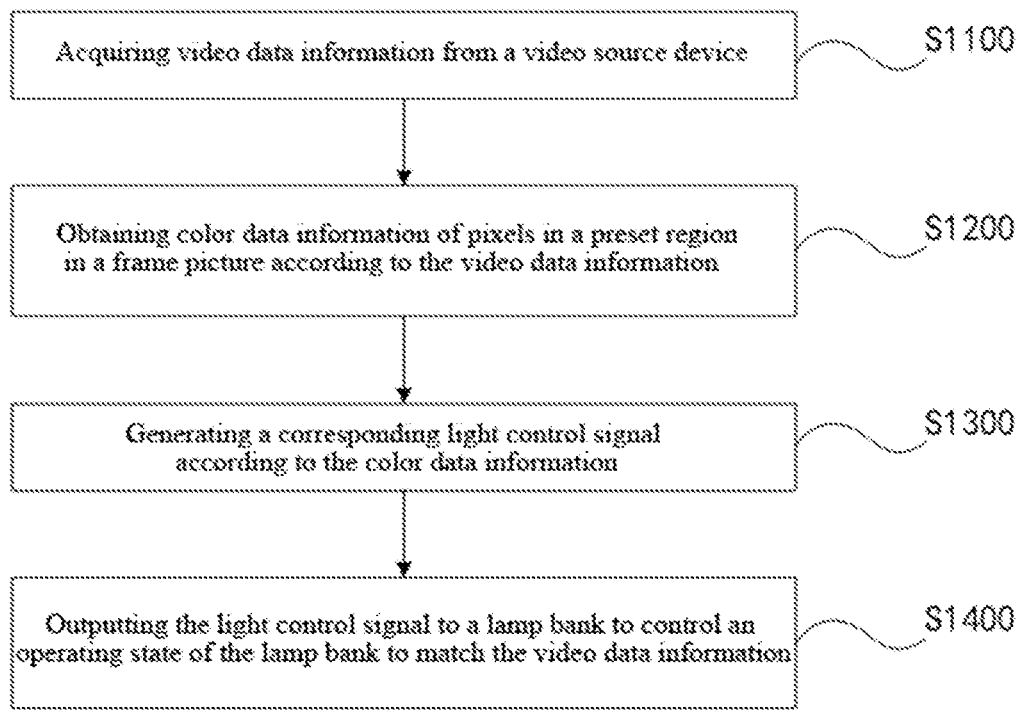
FIG. 3 is a flowchart of a light control method according to an embodiment of the present application.

As shown in FIG. 3, an embodiment of the present application provides a light control method applied to a light controller, wherein the light controller is in communication with a video source device and a lamp bank respectively, and the method includes:

step S1100: acquiring video data information from the video source device;

step S1200: obtaining color data information of pixels in a preset region in a frame picture according to the video data information;

step S1300: generating a corresponding light control signal according to the color data information; and step S1400: outputting the light control signal to the lamp bank to control an operating state of the lamp bank to match the video data information.

In some embodiments, in step S1100, the video data information from the video source device may be acquired by using a video interface, for example, the video data information may be HDMI video information or VGA video information, and the HDMI video information or VGA video information may be acquired by using an HDMI or VGA interface.

In some embodiments, in step S1200, the color data information of the pixels in the preset region in the video frame picture may be captured, and the preset region may be set according to the needs, for example, an edge area of the picture may be selected, or a middle region (generally applicable to wide-screen video playing) may be selected, which is not limited in the present application.

In some embodiments, the picture data output by a display card of the host 210 of the video source device may be read, so as to identify pixel position information and RGB data information corresponding to each pixel, and then generate control signals to control a display state of the LED lamp bank according to a position correspondence between the LED lamp bank and the display screen 220. In some embodiments, the display state of each LED lamp bank changes synchronously with the picture, which can present a colorful display effect and give users an immersive experience, and may be used in various scenarios, such as e-sports, movie watching, and the like.

According to the embodiment of the present application, the video data information from the video source device is acquired, and the corresponding light control signal is generated according to the video data information to control the operating state of the lamp bank to match the video data information, so that the operating state of the lamp bank changes with the change of the video data information, thereby improving the flexibility and the adaptability of the control mode of the lighting device and improving the user experience.

Figure 5:
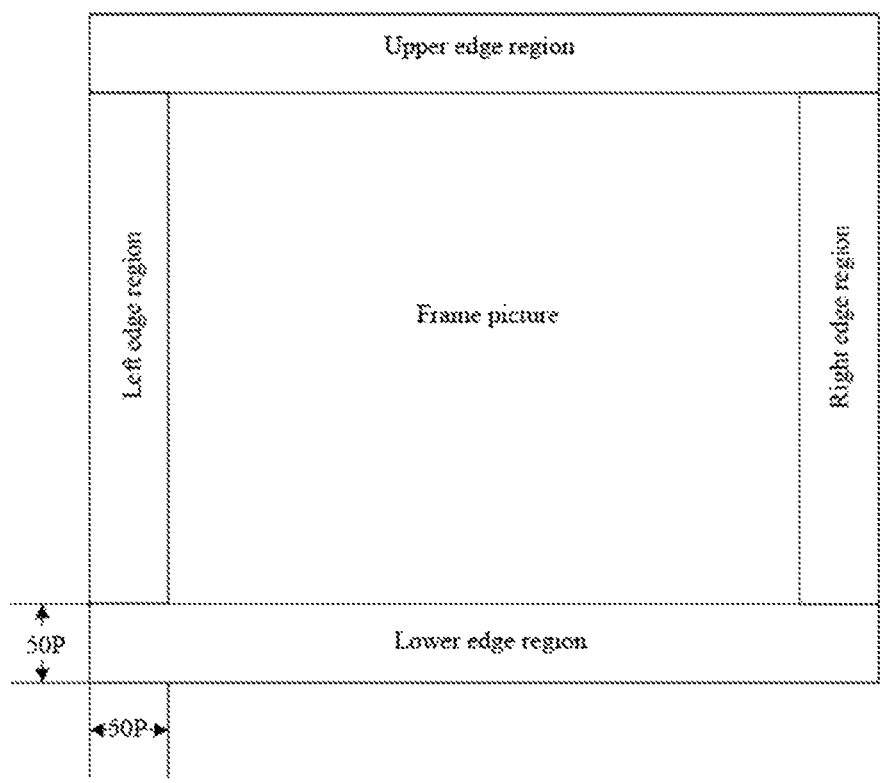
FIG. 5 is a schematic diagram of an edge region color extraction algorithm according to an embodiment of the present application.

Referring to FIG. 5, in some optional embodiments, the preset region is an edge region of the frame picture; and the lamp bank includes N lamp bead units. Each lamp bead unit may include one or more lamp beads. In some embodiments, it is necessary to acquire a number N of the lamp bead units of the lamp bank first, so as to match the picture to realize synchronous light control. The number N of the lamp bead units may be acquired by directly acquiring the preset number N of the lamp bead units, or receiving the number N of the lamp bead units input by the users, or in other methods, such as smart identification and acquisition, which are not limited in the present application.

The generating a corresponding light control signal according to the color data information includes:

step S1311: dividing the edge region of the frame picture into M sub-regions, and calculating regional color values of the M sub-regions according to the color data information of each pixel in each sub-region; wherein, the number M of the sub-regions is matched with the number N of the lamp bead units; for example, M may be equal to N, or M may be proportional to N; and step S1312: generating light control signals corresponding to the N lamp bead units according to the regional color values of the M sub-regions.

In some embodiments, in step S1311, the color data information of pixels in the sub-region are averaged as the regional color value of the sub-region. Obviously, the regional color values of the sub-regions may also be obtained by other calculating methods, such as normal matrix weighting, sinusoidal weighting, brightness-based weighting, or the like, which are not limited in the present application.

In some embodiments, the preset region is an edge region of the frame picture. For example, as shown in FIG. 5, the preset region includes an upper edge region, a lower edge region, a left edge region and a right edge region. The upper edge area is a region with a picture width of 50 P from the upper edge of the frame picture; the lower edge region is a region with a picture width of 50 P from the lower edge of the frame picture; the left edge region is a region with a picture width of 50 P from the left edge of the frame picture; and the right edge region is a region with a picture width of 50 P from the right edge of the frame picture.

Figure 6:
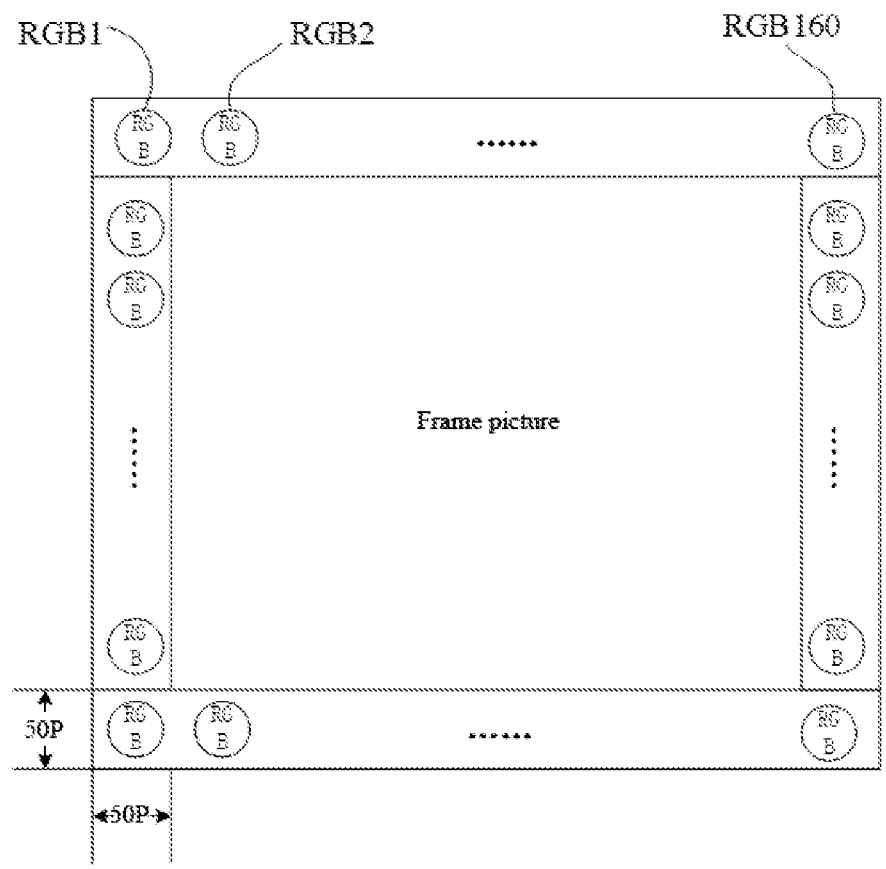
FIG. 6 is a schematic diagram of an edge region color extraction algorithm according to another embodiment of the present application.

In some embodiments, as shown in FIG. 6, taking the upper edge region as an example, the number M of the upper edge sub-regions contained in the upper edge region is equal to the number N of the upper edge lamp bead units, M=N=160, and the number of pixels (resolution) of the frame picture is 1920*1080. In step S1311, the upper edge region may be divided into 160 sub-regions, the pixel length of each sub-region is 12 P (1920/160), and the number of pixels of each upper edge sub-region is 600 P (12 P*50 P). An average color value of these 600 pixels is obtained by calculating to obtain a regional color value of the upper edge sub-region. In a similar fashion, the regional color values of 160 upper edge sub-regions, which are RGB1, RGB2, ..., RGB160, are respectively obtained by calculating to correspondingly drive the 160 upper edge lamp bead units to display colors. The lower edge area is the same and will not be described in detail.

In some embodiments, taking the left edge region as an example, the number M of the left edge sub-regions is equal to the number N of the left edge lamp bead units, M=N=90, and the number of pixels (resolution) of the frame picture is 1920*1080. In step S1311, the left edge region may be divided into 90 sub-regions, the pixel length of each sub-region is 12 P (1080/90), and the number of pixels of each left edge sub-region is 600 P (12 P*50 P). An average color value of these 600 pixels is obtained by calculating to obtain regional color values of the left edge sub-regions. In a similar fashion, the regional color values of 90 left edge sub-regions are respectively obtained by calculating to correspondingly drive the 90 left edge lamp bead units to display colors. The right edge region is the same and will not be described in detail.

In some embodiments, according to the above method, the regional color values of the upper edge region, the lower edge region, the left edge region and the right edge region are simultaneously acquired and calculated, and the 500 sub-regional color values (160 upper edge regions+160 lower edge regions+90 left edge regions+90 right edge regions=500) are sent to the lamp bank through a serial port, which can correspondingly drive the lamp bead units on the four edge regions to display colors, so as to achieve the effect that the display colors of the LED lamp bank located at the matching position of the display screen 220 are synchronized with the display picture colors of the display screen 220, and play a role in setting off the atmosphere and brightening the screen especially when the LED light radiates on a wall or other objects behind the screen, giving users a better immersion experience. The method may be applied to a plurality of scenarios such as e-sports, movie watching, and the like.

In the above scenarios, each lamp bead corresponds to and is synchronized with the display color of each sub-region, which is precise in synchronization, but also brings about a problem of large data transmission volume, that is, a large communication data volume between the light controller and the LED lamp bank. In other scenarios, precise synchronization is not required, but only a principal color of the preset region needs to be synchronized to achieve the effect of setting off the atmosphere. In some other scenarios, the light controller is connected with the LED lamp bank wirelessly with small bandwidth, which does not support large data transmission. The following picture principal color synchronization method may be adopted in these scenarios.

In some optional embodiments, the preset region is an edge region of the frame picture. The lamp bank includes N lamp bead units.

Correspondingly, the generating a corresponding light control signal according to the color data information includes:

step S1321: dividing the edge region of the frame picture into M sub-regions, and calculating regional color values of the M sub-regions according to the color data information of each pixel in each sub-region;

step S1322: carrying out weighted average operation on the regional color values of the M sub-regions to obtain a color value of the lamp bank; and step S1323: generating the light control signal according to the color value of the lamp bank.

Different from the foregoing embodiments, in this scenario, the number M of the sub-regions is not necessary to be matched with the number N of the lamp bead units.

In some embodiments, the preset region is an edge region of the frame picture. For example, as shown in FIG. 5, the preset region includes an upper edge region, a lower edge region, a left edge region and a right edge region. The upper edge area is a region with a picture width of 50 P from the upper edge of the frame picture; the lower edge region is a region with a picture width of 50 P from the lower edge of the frame picture; the left edge region is a region with a picture width of 50 P from the left edge of the frame picture; and the right edge region is a region with a picture width of 50 P from the right edge of the frame picture.

In some embodiments, as shown in FIG. 6, taking the upper edge region as an example, the number M of the upper edge sub-regions is equal to 160, and the number of pixels (resolution) of the frame picture is 1920*1080. In step S1321, the upper edge region may be divided into 160 sub-regions, the pixel length of each sub-region is 12 P (1920/160), and the number of pixels of each upper edge sub-region is 600 P (12 P*50 P). An average color value of these 600 pixels is obtained by calculating to obtain regional color values of the upper edge sub-regions. In a similar fashion, the regional color values of 160 upper edge sub-regions, which are RGB1, RGB2, . . . , RGB160, are respectively obtained by calculating.

Then, step S1322 is executed to carry out weighted average operation on the regional color values of the M sub-regions to obtain a color value of the lamp bank. For example, the weight corresponding to each upper edge sub-region may be set by using a normal distribution function or a triangle function, that is, the weights X1, X2, . . . , X160 corresponding to the regional color values RGB1, RGB2, . . . , RGB160 conform to the normal distribution function or triangle function. In this case, the weight corresponding to the upper edge sub-region in the middle is larger, and the weights corresponding to the upper edge sub-regions on both sides are smaller. For example, the weights X80 and X81 corresponding to the regional color values RGB80 and RGB81 of the upper edge sub-regions in the middle are the largest, and the weights X1 and X160 corresponding to the upper edge sub-regions RGB1 and RGB160 on both sides are the smallest. When the weight corresponding to each upper edge sub-region is set by using the normal distribution function, it forms a curve rising from the weight X1 to the weight X80 and falling from the weight X80 to the weight X160, so that the values of the weight X1 to the weight X160 obey normal distribution. When the weight corresponding to each upper edge sub-region is set by using the triangle function, the values rise linearly from the weight X1 to the weight X80 and fall linearly from the weight X80 to the weight X160, so that the values of the weight X1 to the weight X160 obey an isosceles triangle function. For example, the triangle function may be:

$$y = \frac{(a - |x - a|)}{\Sigma(a - |x - a|)};$$

where a is a constant, which may be set according to the number of the edge sub-regions, and $$\frac{1}{\Sigma(a - |x - a|)}$$

is a normalized function; for example, for 160 edge sub-regions, it may be set that a=80, then the value of the function Y corresponding to the independent variable x from 1 to 160 is the value of the weight X1 to the weight X160.

Figure 7:
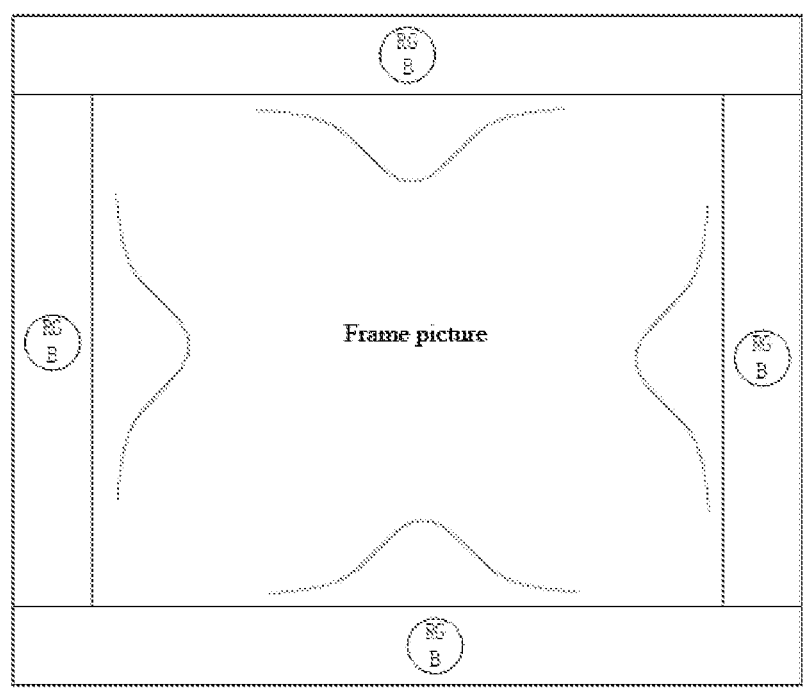
FIG. 7 is a schematic diagram of an edge region color extraction algorithm according to another embodiment of the present application.

The schematic diagram of a normal distribution average algorithm is shown in FIG. 7.

In some embodiments, a formula for calculating the regional color value RGB_U of the upper edge region is as follows:

$$RGB\_U = \frac{RGB1*X1 + RGB2*X2 + \ldots + RGB160*X160}{X1 + X2 + \ldots + X160}$$

the calculation methods of the regional color values of the lower edge region, the left edge region and the right edge region are similar to the calculation method of the regional color value RGB_U of the upper edge region, and will not be repeated here.

By using the weighted calculation method, the principal color may be selected by coefficient setting, which can overcome the situation of white display due to lack of principal color caused by average calculation, so as to better play the role of setting off the atmosphere and brightening the screen, giving users a better immersion experience. Meanwhile, because there is only one color output in the upper edge region, the communication data volume between the light controller and the LED lamp bank is greatly reduced, which is suitable for wireless data transmission with small bandwidth.

In some optional embodiments, the video data information is HDMI video information or VGA video information.

The obtaining color data information of pixels in a preset region in a frame picture according to the video data information in step S1200 includes:

step S1210: converting the video data information into UVC video data information; and step S1220: obtaining the color data information of the pixels in the preset region in the frame picture according to the UVC video data information.

In some embodiments, it is necessary to process a format of the video before acquiring the color data information of the pixels in the preset region in the frame picture. For example, if the video data information is HDMI video information or VGA video information, the video data in the first format may be converted into the video data in the second format by performing steps S1210 to S1220 for subsequent processing.

For example, the video data in the first format may be HDMI (High Definition Multimedia Interface) information, and the video data in the second format may be UVC (USB Video Class) video information. Using UVC can implement stronger scalability and compatibility, which is compatible with an external UVC device.

Figure 8:
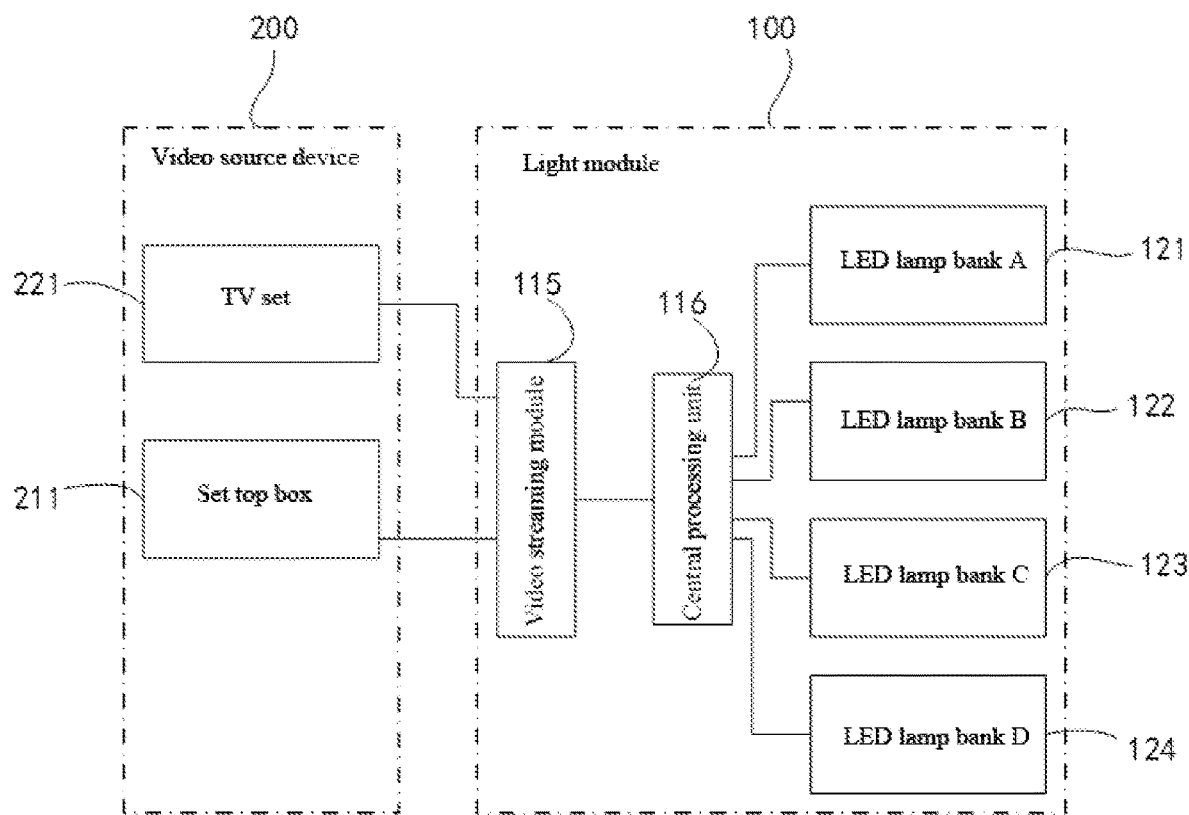
FIG. 8 is a schematic diagram of a system architecture of a light control system according to an embodiment of the present application.

In some embodiments, when the video source device is a TV set with a set top box or a video source device composed of a set top box and a TV set, it is necessary to decode data output by the set top box and then generate a control signal to control the operating state of at least one LED lamp bank. That is, as shown in FIG. 8, in some embodiments, the light controller 110 of the light module 100 may include a video streaming module 115 and a central processing unit 116. The video source device 200 includes a TV set 221 and a set top box 211. An input end of the video streaming module 115 is connected with an output end of the set top box 211, which is configured for receiving the video data in the first format from the set top box 211. One output end of the video streaming module 115 is connected with the TV set 221, and is configured for transmitting the video data in the first format to the TV set 221 for display. The other output end of the video streaming module 115 is connected with the central processing unit 116, and the central processing unit 116 is connected with each LED lamp bank and configured for driving the light controller to control the operating state of the LED lamp bank according to the video data in the first format.

In some embodiments, the central processing unit 116 can decode the data output from the set top box by using a special chip based on Linux. For example, Allwinner V3S series chips may be used to run a video decoding algorithm based on a Linux platform.

Figure 9:
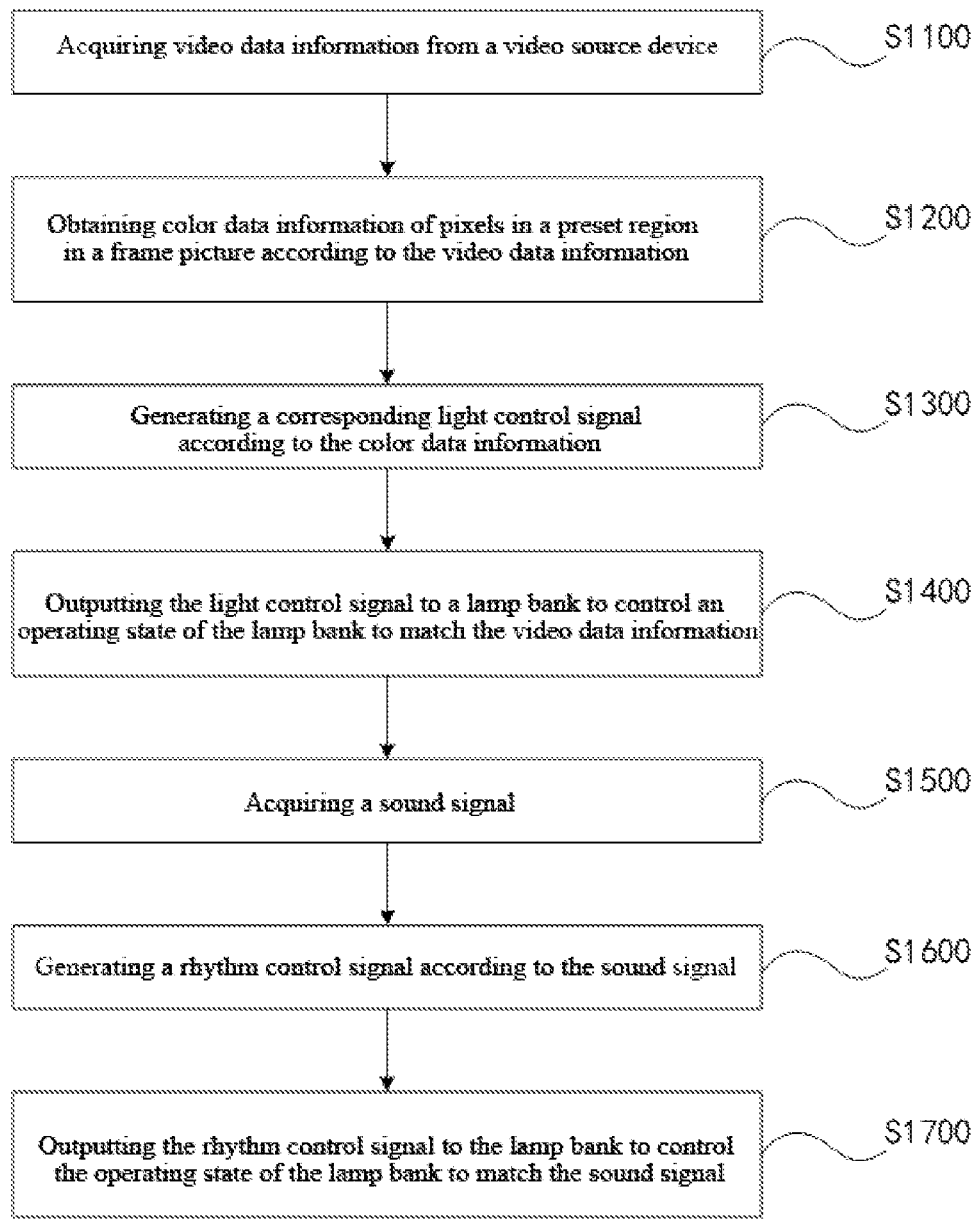
FIG. 9 is a flowchart of a light control method according to another embodiment of the present application.

Referring to FIG. 9, in some optional embodiments, the light control method further includes:

step S1500: acquiring a sound signal;

step S1600: generating a rhythm control signal according to the sound signal; and step S1700: outputting the rhythm control signal to the lamp bank to control the operating state of the lamp bank to match the sound signal.

In some embodiments, the present application can also realize a sound-color synchronization mode by performing steps S1500 to S1700. In the sound-color synchronization mode, a bright color state of the LED lamp bank is synchronized with a color of the display picture, and other operating states (such as blinking state) of the LED lamp bank are synchronized with the sound signal.

In some embodiments, in step S1600, the rhythm control signal may be generated according to the sound signal. For example, a signal point with specific frequency or amplitude may be extracted from the sound signal. When the signal point satisfying specific frequency or amplitude requirements appears in the sound signal, the LED lamp bank is correspondingly controlled to be on or off or brighten, so as to control the operating state of the lamp bank to rhythm with the sound signal.

In some optional embodiments, the acquiring a sound signal includes:

step S1510: acquiring a sound signal collected from a microphone; and the generating a rhythm control signal according to the sound signal includes:

step S1610: acquiring a signal point satisfying a specific frequency requirement in the sound signal; and step S1620: generating the rhythm control signal for controlling flashing of the lamp bank according to the signal point.

In some embodiments, the sound signal comes from an external sound signal collected by a microphone. The sound-color synchronization mode enables each LED lamp bank to control light changes with the rhythm of music, and may be used in a plurality of scenarios, such as music appreciation, disco dancing, and the like.

Figure 10:
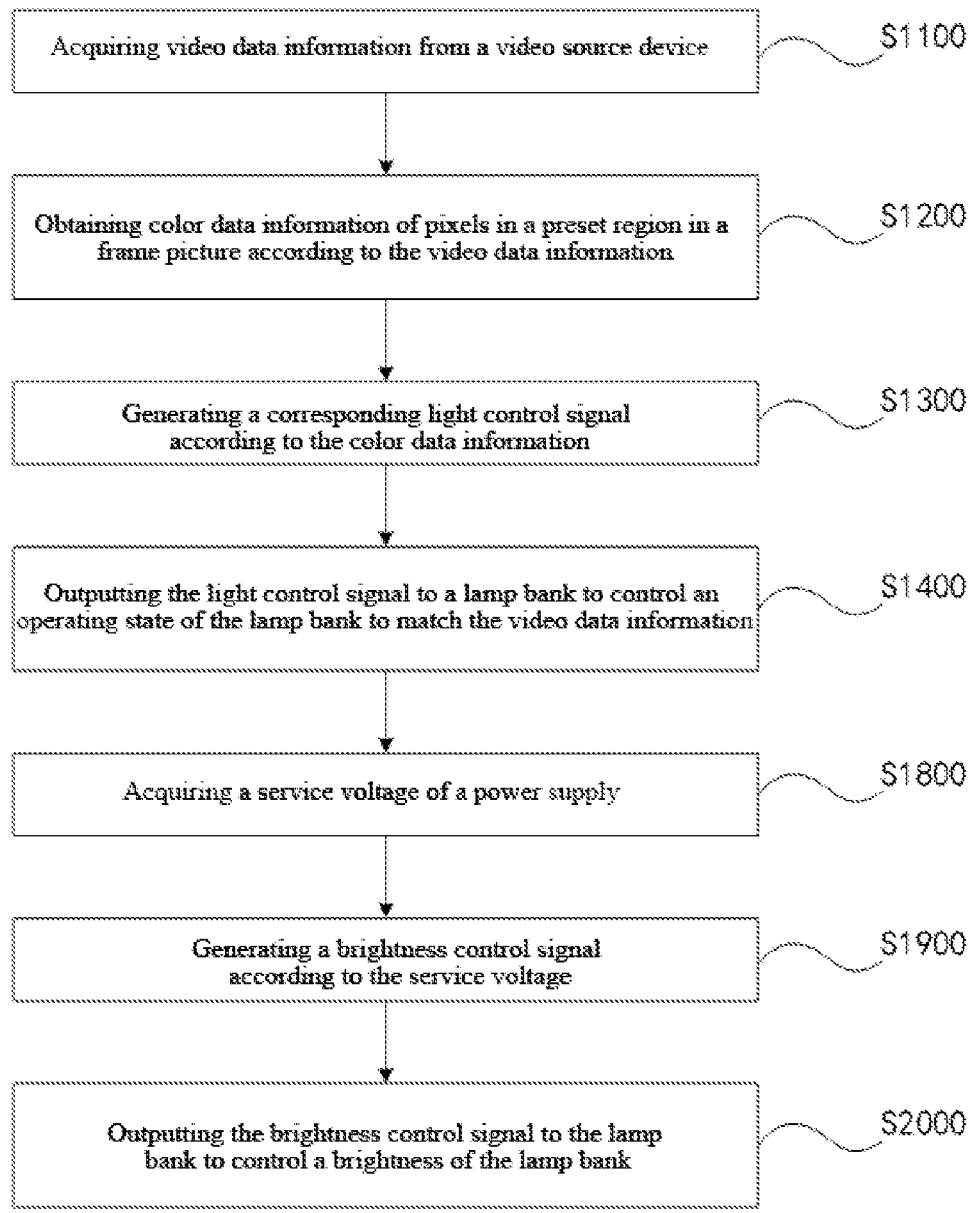
FIG. 10 is a flowchart of a light control method according to another embodiment of the present application.

Referring to FIG. 10, in some optional embodiments, the light control method further includes:

step S1800: acquiring a service voltage of a power supply;

step S1900: generating a brightness control signal according to the service voltage; and step S2000: outputting the brightness control signal to the lamp bank to control a brightness of the lamp bank.

In some embodiments, by executing step S1800, the service voltage of the power supply of the lamp bank is acquired, and the brightness of the lamp bank is controlled according to the service voltage. For example, when the service voltage is sufficient, the brightness of the lamp bank may be controlled to be brighter; and when the service voltage is insufficient, the brightness of the lamp bank may be controlled to be darker to save electric energy.

In some optional embodiments, the lamp bank includes one or more of the followings:
  a lamp strip arranged around a back of a display screen;
  a lamp strip arranged around an edge of an indoor ceiling;
  a lamp strip arranged around an edge of a floor; and
  a vertical lamp strip.

In some embodiments, the LED lamp bank is positioned to be matched with the display picture of the display screen 220 of the video source device 200, so that a lighting state (operating state) of the LED lamp bank can match a display picture content of the display screen. For example, the LED lamp bank may be an LED lamp strip, which is respectively arranged on a back or a side face of the display screen 220 of the video source device 200. For another example, the plurality of LED lamp banks are correspondingly arranged on four sides of the display screen facing a ceiling/floor/wall of a living room/cinema respectively. For another example, the LED lamp bank may be a vertical lamp bank, which is correspondingly arranged on two sides of the display screen respectively. Other setting methods may be adopted, which are not limited in the present application.

According to the embodiment of the present application, the video data information from the video source device is acquired, and the corresponding light control signal is generated according to the video data information to control the operating state of the lamp bank to match the video data information, so that the operating state of the lamp bank changes with the change of the video data information, thereby improving the flexibility and the adaptability of the control mode of the lighting device and improving the user experience.

Figure 11:
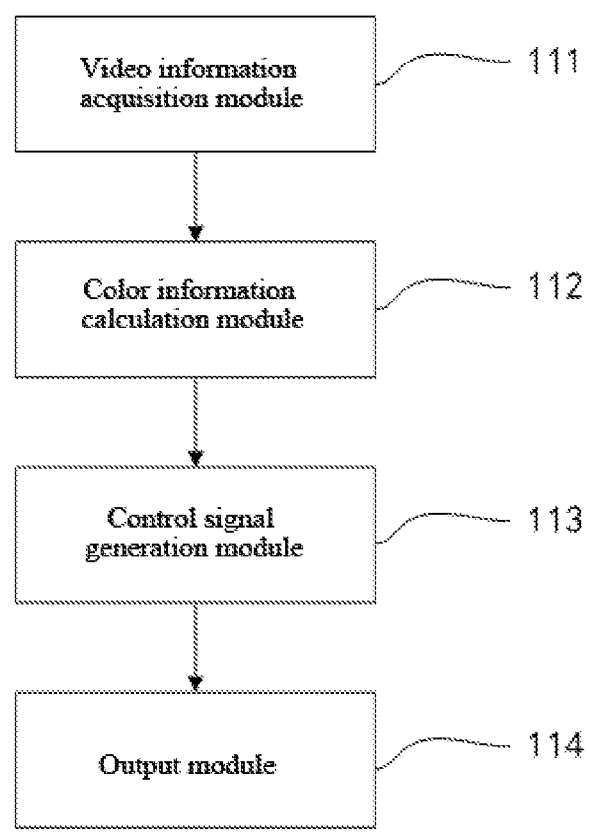
FIG. 11 is a schematic diagram of modules of a light control apparatus according to an embodiment of the present application.

In a second aspect, as shown in FIG. 11, the present application further provides a light control apparatus applied to a light controller, wherein the light controller is in communication with a video source device and a lamp bank respectively, and the apparatus includes:
  a video information acquisition module 111, configured for acquiring video data information from the video source device;
  a color information calculation module 112, configured for obtaining color data information of pixels in a preset region in a frame picture according to the video data information;
  a control signal generation module 113, configured for generating a corresponding light control signal according to the color data information; and
  an output module 114, configured for outputting the light control signal to the lamp bank to control an operating state of the lamp bank to match the video data information.

It should be noted that the light control apparatus in this embodiment may be applied to the system architecture of the embodiment shown in FIG. 1. In addition, the light control apparatus in this embodiment can perform the light control method in the embodiment shown in FIG. 3. That is, the light control apparatus in this embodiment, the system architecture of the embodiment shown in FIG. 1, and the light control method in the embodiment shown in FIG. 3 all belong to the same inventive concept, so these embodiments have the same implementation principles and technical effects, and will not be described in detail here.

The above-described apparatus embodiments are merely illustrative, wherein the units that are described as separate components may or may not be physically separated, i.e., may be located in one place or distributed across a plurality of network units. Part or all of the modules therein may be selected according to actual needs to realize the objective of the technical solution of the embodiment.

According to the embodiment of the present application, the video data information from the video source device is acquired, and the corresponding light control signal is generated according to the video data information to control the operating state of the lamp bank to match the video data information, so that the operating state of the lamp bank changes with the change of the video data information, thereby improving the flexibility and the adaptability of the control mode of the lighting device and improving the user experience.

In addition, the present application further provides a light controller, including: a memory on which a computer program is stored; and a processor, configured for executing the computer program in the memory to realize the light control method as described above.

Figure 12:
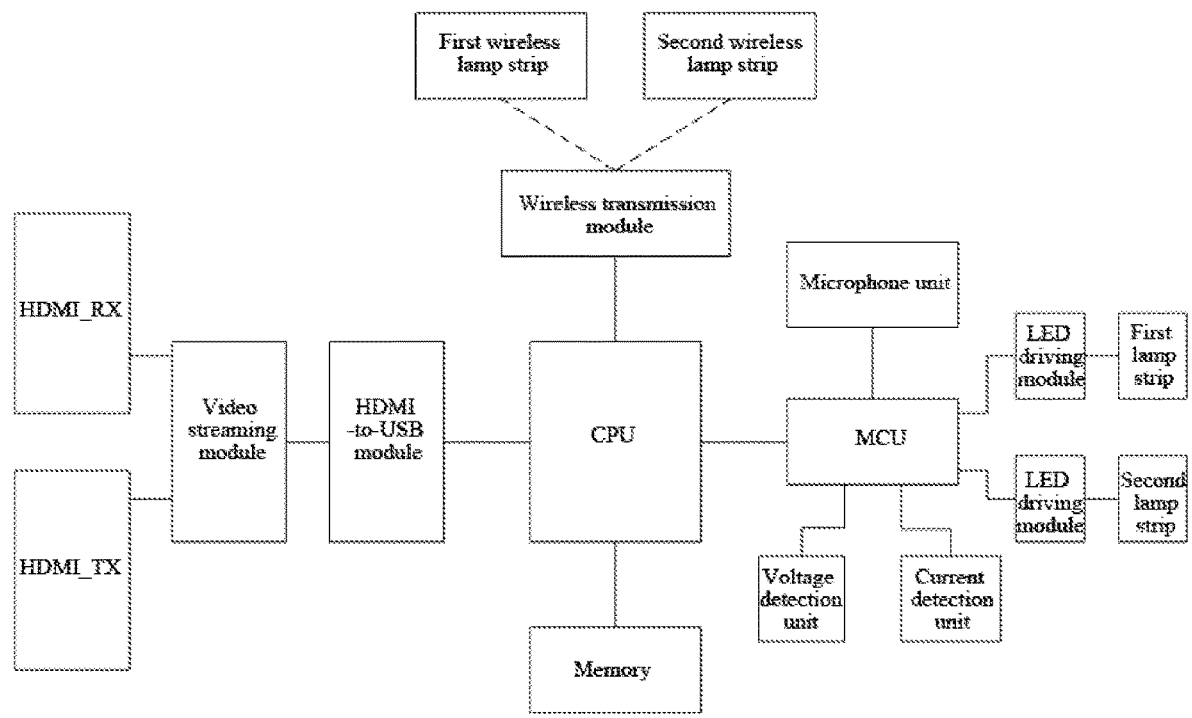
FIG. 12 is a schematic circuit diagram of a light controller according to an embodiment of the present application.

The memory may be a built-in memory or an external memory. The processor may include a plurality of processing units, as shown in FIG. 12, which may include a central processing unit CPU and a micro-control unit MCU. The processor and the memory may be connected by a bus or other means.

As a non-transient computer-readable storage medium, the memory may be used to store non-transient software programs and non-transient computer-executable programs. In addition, the memory may include a high-speed random access memory, and may also include a non-transitory memory, such as at least one disk memory device, a flash memory device, or other non-transitory solid state memory device. In some optional embodiments, the memory may optionally include memories remotely located with respect to the processor, and these remote memories may be connected to the processor via networks. Examples of the networks above include, but are not limited to, the Internet, intranet, local area networks, mobile communication networks, and combinations thereof.

It should be noted that, the light controller in this embodiment may be applied to the system architecture of the embodiment shown in FIG. 1, and the light controller in this embodiment and the light control apparatus in the system architecture of the embodiment shown in FIG. 1 have the same inventive concept, so these embodiments have the same implementation principles and technical effects, and will not be described in detail here.

Non-transient software programs and instructions required to realize the light control method of the foregoing embodiments are stored in the memory, and when being executed by the processor, perform the light control method in the foregoing embodiments, for example, perform the method steps S1100 to S1400 in FIG. 3, the method steps S1100 to S1700 in FIG. 9 and the method steps S1100 to S2000 in FIG. 10 described above.

Referring to FIG. 12, the following description will take the video data information being HDMI video information as an example. In some embodiments, the light controller includes a video input interface HDMI_RX, a video output interface HDMI_TX, a video streaming module, a Central Processing Unit CPU and a Micro-control Unit MCU which are connected in sequence. The video input interface HDMI_RX may be connected with a host of the video source device through an HDMI cable, and configured for acquiring the video data information from the video source device. An input end of the video streaming module 115 is connected with an output end of the host of the video source device, and configured for receiving the video data information from the video source device. One output end HDMI_TX of the video streaming module is connected with a display screen of the video source device, and configured for transmitting the video data information to the display screen for display. The other output end of the video streaming module is connected with an input end of the Central Processing Unit CPU, and the Central Processing Unit CPU is connected with each LED lamp bank (such as a first lamp strip and a second lamp strip) and configured for controlling the operating state of the LED lamp bank according to the video data information.

Referring to FIG. 12, in some embodiments, the light controller further includes:

an HDMI-to-USB module, wherein the HDMI-to-USB module is connected between the video streaming module and the Central Processing Unit CPU, and the HDMI-to-USB module is configured for converting HDMI video information into UVC video data information.

In some embodiments, the Central Processing Unit CPU receives UVC video data information transmitted by the HDMI-to-USB module.

In some embodiments, the Central Processing Unit CPU is connected with each LED lamp bank (such as a first lamp strip and a second lamp strip) through the Micro-control Unit MCU. Referring to FIG. 12, the light controller 110 further includes: an LED driving module electrically connected with the Micro-control Unit MCU and the LED lamp bank respectively, and configured for controlling the operating state of the LED lamp bank according to the control signal of the light controller.

Figure 13:
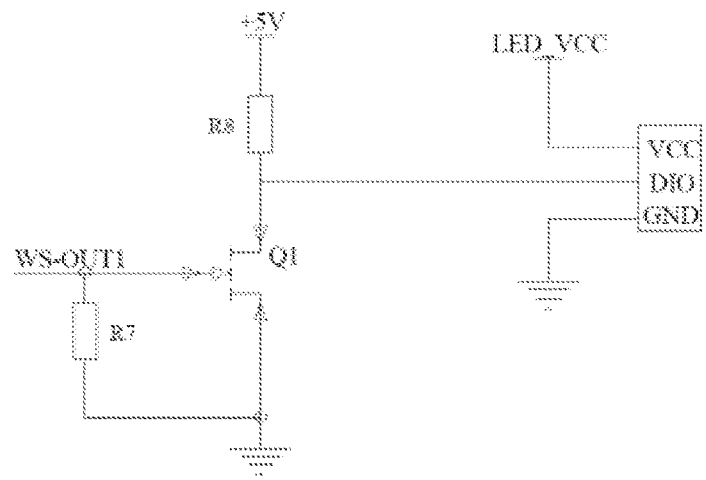
FIG. 13 is a schematic circuit diagram of an LED driving module according to an embodiment of the present application.

In some embodiments, the light controller 110 correspondingly controls the LED lamp bank (such as a first lamp strip and a second lamp strip) through a plurality of LED driving modules. The LED driving module may include an MOSFET or a triode. For example, referring to FIG. 13, in some embodiments, because the data communication between the lamp beads 130 in the lamp bank is serial, the micro-control unit MCU can connect one lamp bead in one lamp module 100 through a serial port, so that the display of the whole lamp module 100 can be realized. In order to facilitate the understanding of direct connection between the lamp bead and the micro-control unit MCU, refer to a terminal WS_OUT1 in FIG. 13, which is connected with the micro-control unit MCU and receives a control signal of the micro-control unit MCU, and drives the signal to be output to the corresponding LED lamp bank through a terminal DIO. By analogy, the light control of the plurality of LED lamp banks can be realized. The LED driving module further includes resistors R7 and R8.

Referring to FIG. 12, in some embodiments, the light controller further includes:

a wireless transmission module respectively connected with the central processing unit CPU and the lamp bank. The wireless transmission module is configured for receiving a light control signal from the central processing unit CPU, and sends the light control signal to the LED lamp bank (such as a first wireless lamp strip and a second wireless lamp strip) wirelessly. The lamp bank is required to have a wireless receiving function, as shown in FIG. 12.

The wireless communication module may be a 2.4G communication module, a Wi-Fi communication module, a Bluetooth communication module, an infrared communication module or a ZigBee communication module, and the like. In some embodiments, the central processing unit CPU uses the weighted calculation method from step S1321 to step S1323 as mentioned above to generate the light control signal according to the regional color and wirelessly transmit the light control signal to the lamp bank (wireless lamp bank), which overcomes the situation of white display due to lack of principal color caused by average calculation, so as to better play the role of setting off the atmosphere and brightening the screen, giving users a better immersion experience. Meanwhile, because there is only one color output in the upper edge region, the communication data volume between the light controller and the LED lamp bank is greatly reduced, which is suitable for wireless data transmission with small bandwidth. For example, in some embodiments, a wireless chip with model NRF24L01 may be employed as the wireless communication module, and the NRF24L01 is a novel single-chip RF transceiver and operates in a frequency band ranging from 2.4 GHz to 2.5 GHz. The wireless communication module is internally provided with a frequency synthesizer, a power amplifier, a crystal oscillator, a modulator and other functional modules, and has the characteristic of low power consumption.

Referring to FIG. 12, in some embodiments, the light controller further includes:

a microphone unit, wherein an output end of the microphone unit is connected with an input end of the micro-control unit MCU, and the microphone unit is configured for acquiring a sound signal and transmitting the sound signal to the micro-control unit MCU, so that the micro-control unit MCU can generate a rhythm control signal according to the sound signal and output the rhythm control signal to the lamp bank, so as to control the operating state of the lamp bank to match the sound signal and realize sound-color synchronization. In some embodiments, the microphone unit includes a microphone and a first operational amplifier circuit, and the microphone is connected with the micro-control unit MCU through the first operational amplifier circuit.

Figure 14:
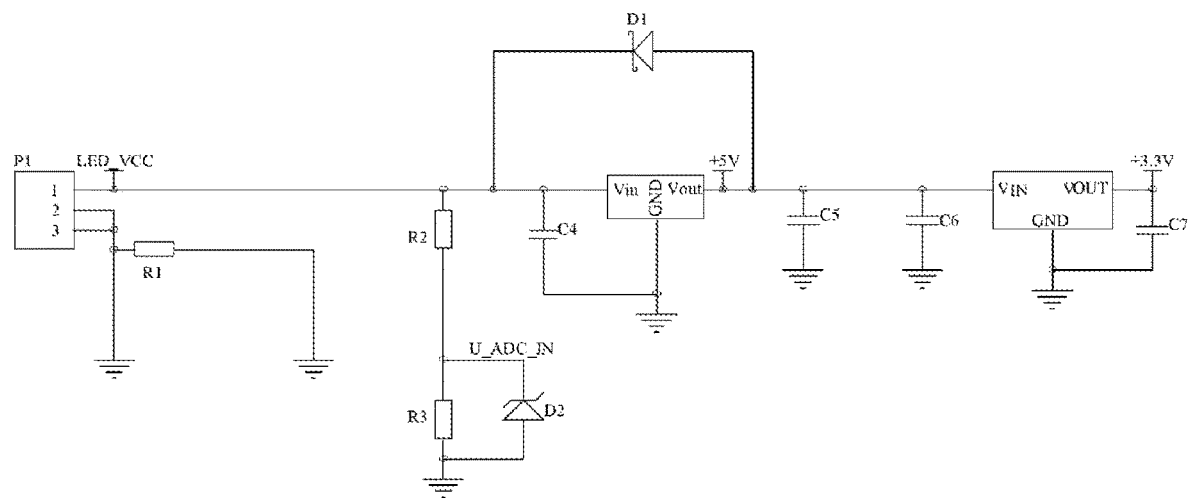
FIG. 14 is a schematic circuit diagram of a voltage detection module according to an embodiment of the present application.

Referring to FIG. 12, in some embodiments, the light controller further includes:

a voltage detection unit, wherein an output end of the voltage detection unit is connected with the input end of the micro-control unit MCU, and the voltage detection unit is configured for acquiring a service voltage of a power supply and transmitting the service voltage to the micro-control unit MCU, so that the micro-control unit MCU can generate a brightness control signal according to the service voltage and output the brightness control signal to the lamp bank, so as to control the brightness of the lamp bank to realize the effects of energy saving or voltage abnormality protection. In some embodiments, FIG. 14 is a circuit diagram of the above-mentioned voltage detection unit. A bleeder circuit including a second resistor and a third resistor collects a service voltage LED_VCC of the LED lamp bank, and a terminal U_ADC_IN in the voltage detection unit is connected with the micro-control unit MCU, so that the voltage collected by the voltage detection unit can be transmitted to the micro-control unit MCU. The voltage detection unit further includes other circuits including voltage regulators, capacitors and resistors, all of which will not be repeated here.

The light controller further includes a current detection unit, wherein an output end of the current detection unit is connected with the input end of the micro-control unit MCU, and the current detection unit is configured for acquiring a current value of the lamp strip and transmitting the current value of the lamp strip to the micro-control unit MCU, so that the micro-control unit MCU can carry out corresponding operations according to the current value of the lamp strip, such as testing the number of the lamp beads, carrying out current abnormality protection, and the like.

According to the embodiment of the present application, the video data information from the video source device is acquired, and the corresponding light control signal is generated according to the video data information to control the operating state of the lamp bank to match the video data information, so that the operating state of the lamp bank changes with the change of the video data information, thereby improving the flexibility and the adaptability of the control mode of the lighting device and improving the user experience.

In addition, as shown in FIG. 1, the present application further provides a light module, including:

the light controller as mentioned above, wherein the light controller is in communication with a video source device; and a lamp bank, wherein the lamp bank is in communication with the light controller.

In some embodiments, the specific description of the light controller is provided as above, and will not be repeated again. The light controller may be in communication with the host of the video source device 200 through the video input interface, as shown in FIG. 1. It may be understood that the above-mentioned video source device 200 may be a computer, a PAD or other devices with display, and is not limited in this embodiment.

It should be noted that the at least one LED lamp bank may be one set of LED lamp strips, or two sets of LED lamp strips, or four sets of LED lamp strips, and the like. For example, the at least one LED lamp bank may be one set of LED lamp strips circling around the edge region on the back of the display screen; may also be two sets of LED lamp strips, with each set of LED lamp strips respectively arranged along the edge region of one long side and one short side on the back of the display screen; and may also be four sets of LED lamp strips, and the like, which is not limited in the embodiment of the present application. In the following, only four sets of LED lamp strips are taken as an example for description.

For example, as shown in FIG. 2, at least one LED lamp bank includes four LED lamp strips, namely an LED lamp strip A 121, an LED lamp strip B 122, an LED lamp strip C 123 and an LED lamp strip D 124. The LED lamp strip A 121, the LED lamp strip B 122, the LED lamp strip C 123 and the LED lamp strip D 124 are all connected with the light controller 110, the light controller 110 is connected with the host 210 of the video source device 200, and the host 210 is connected with the display screen 220. As shown in FIG. 2, the LED lamp strip A 121, the LED lamp strip B 122, the LED lamp strip C 123 and the LED lamp strip D 124 are respectively arranged on the back of the display screen 220 near the edge of the display screen 220. The LED lamp strip A 121 is arranged along an upper edge of the display screen 220, the LED lamp strip B 122 is arranged along a lower edge of the display screen 220, the LED lamp strip C 123 is arranged along a left edge of the display screen 220, and the LED lamp strip D 124 is arranged along a right edge of the display screen 220. For another example, the four sets of LED lamp strips are correspondingly arranged on four sides of the display screen facing an indoor space respectively. For another example, the four sets of LED lamp strips are correspondingly arranged on four sides of the display screen facing a ceiling/floor/wall of a living room/cinema respectively. In a picture synchronization mode, the display picture content of the display screen can be matched with the bright color state of the corresponding LED lamp bank, thereby enhancing an immersion feeling of watching the display screen frame and avoiding visual fatigue, and further improving the viewing experience of users.

In some embodiments, referring to FIG. 1, FIG. 2 and FIG. 4, at least one LED lamp bank includes four sets of LED lamp strips, namely the LED lamp strip A 121, the LED lamp strip B 122, the LED lamp strip C 123 and the LED lamp strip D 124 respectively. The LED lamp strip includes a plurality of smart integrated LED light sources which are sequentially connected in series; and the four sets of LED lamp strips are correspondingly arranged on four sides of the back of the display screen 220 of the video source device 200 respectively. Two sets are long side lamp banks and two sets are short side lamp banks. In some other embodiments, at least one LED lamp bank includes two sets of LED lamp strips, namely an LED lamp strip E and an LED lamp strip F, and the LED lamp strip includes a plurality of smart integrated LED light sources sequentially connected in series. Two sets of LED lamp strips are correspondingly arranged on four sides of the back of the display screen 220 of the video source device 200, that is, the LED lamp strip E and the LED lamp strip F are both bent into an L-shape, and two sets of LED lamp strips are symmetrically arranged to form a rectangle, and are correspondingly arranged on four sides of the back of the display screen 220. A power supply 400 is used to supply power to the light module 100.

In some embodiments, this embodiment specifically provides a specific load controlled by the light controller 110, that is, the LED lamp bank. The LED lamp bank may include a plurality of lamp beads 130, wherein the plurality of lamp beads 130 may be distributed on different LED lamp banks according to the actual application requirements, for example, for the display screen 220 with a size of 14 inches and 21 inches, the LED lamp banks need to be distributed on the four sides of each display screen 220 to achieve the brightening effect. Therefore, both the display screens 220 with sizes of 14 inches and 21 inches need four LED lamp strips (or two LED lamp strips, as mentioned above). However, due to the difference in size, the lengths of the LED lamp banks required by the two display screens are different, for example, the display screen with the size of 14 inches requires four LED lamp strips with 30 lamp beads 130, while the display screen with the size of 21 inches requires may require four LED lamp strips with 50 lamp beads 130, but the length and the number of the LED lamp banks are selected or set according to the actual application scenarios and are not necessarily to be limited in some embodiments. The lamp strips on the ceiling, the wall and the floor, and the vertical lamp strip are the same, and will not be repeated here.

According to the embodiment of the present application, different application scenarios of the light module 100 can be realized, and the application range of the light controller 110 is correspondingly increased, thus improving the practicability of the light controller.

As shown in FIG. 1, in some embodiments, the LED lamp bank includes at least one LED lamp bank, which is respectively arranged on different positions of the display screen 220 of the video source device 200. The light controller 110 may acquire color data from the video source device in real time, and then transmit a corresponding color value which is RGB data, to the corresponding LED lamp bank according to the actual physical position of the lamp strip, thus the frame-color synchronization LED lamp bank of the display screen 220.

As shown in FIG. 2, in some embodiments, a chip of WS2812 series or WS2813 series is employed in the lamp beads 130 (smart integrated LED light source) in the LED lamp bank 100.

In some embodiments, the lamp bead 130 using WS2812 series chip (such as WS2812B) is formed by integrating a control circuit and an RGB chip in a 5050 packaged device to form a complete externally-controlled pixel. Any pixel receives a signal and then outputs the signal after waveform shaping, which ensures that circuit waveform distortion will not accumulate. Moreover, power-on reset and power-off reset circuits are built in, and 256-level brightness display of the three primary colors RGB of each pixel can be realized to complete full-color display of 16,777,216 colors, with a scanning frequency no less than 400 Hz. Moreover, a serial cascade interface can receive and decode data through one signal line, and no circuit is needed when the transmission distance between any two points is no more than 3 m.

According to the embodiments of the present application, the lamp beads 130 using WS2812 series chip are selected, which can make the control of the light module 100 by the light controller 110 simpler and more efficient, and improve the detection efficiency and reliability.

According to the embodiments of the present application, the video data information from the video source device is acquired, and the corresponding light control signal is generated according to the video data information to control the operating state of the lamp bank to match the video data information, so that the operating state of the lamp bank changes with the change of the video data information, thereby improving the flexibility and the adaptability of the control mode of the lighting device and improving the user experience.

Moreover, the present application further provides a computer-readable storage medium storing a computer-executable instruction, wherein the program instruction, when executed by a processor, implements the light control method mentioned above. For example, when being executed by one processor in the light controller embodiments mentioned above, the above-mentioned processor is enabled to execute the light control method in the foregoing embodiments, for example, execute the method steps S1100 to S1400 in FIG. 3, the method steps S1100 to S1700 in FIG. 9 and the method steps S1100 to S2000 in FIG. 10 described above.

Those of ordinary skills in the art will appreciate that all or some of the steps and systems in the methods disclosed above may be implemented as software, firmware, hardware, and suitable combinations thereof. Some physical components or all of the physical components may be implemented as software executed by a processor, such as a central processing unit, a digital signal processor or a microprocessor, or implemented as hardware, or implemented as an integrated circuit, such as an application specific integrated circuit. Such software may be distributed on a computer-readable medium, which may include a computer storage medium (or non-transitory medium) and a communication medium (or transitory medium). As well known to those of ordinary skills in the art, the term computer storage medium includes volatile and non-volatile, removable and non-removable media implemented in any method or art for storing information (such as computer-readable instruction, data structure, programming module or other data). The computer storage medium includes, but is not limited to, RAM, ROM, EEPROM, flash memory or other memory technology, CD-ROM, digital versatile disc (DVD) or other optical disc memory, magnetic cassette, magnetic tape, magnetic disk memory or other magnetic memory device, or may be any other medium that can be used to store the desired information and can be accessed by a computer. Moreover, it is well known to those of ordinary skills in the art that the communication medium typically includes computer-readable instructions, data structures, program modules, or other data in a modulated data signal, such as a carrier wave or other transmission mechanism, and may include any information delivery medium.

The foregoing describes the preferred embodiments of the present application in detail, but the embodiments of the present application are not limited to the foregoing embodiments. Those having ordinary skill in the art can make various equal deformations or replacements without departing from the spirit of the embodiments of the present application, and these equal deformations or replacements shall all fall within the scope limited by the claims of the embodiments of the present application.

The invention claimed is:

1. A light control method applied to a light controller, wherein the light controller is in communication with a video source device and a lamp bank respectively, and the method comprises:

acquiring video data information from the video source device;

obtaining color data information of pixels in a preset region in a frame picture according to the video data information, wherein the preset region is an edge region of the frame picture, and the edge region comprises an upper edge region and/or a lower edge region, and a left edge region and/or a right edge region;

generating a corresponding light control signal according to the color data information; and outputting the light control signal to the lamp bank to control an operating state of the lamp bank to match the video data information;

wherein, the generating the corresponding light control signal according to the color data information comprises:

dividing the edge region of the frame picture into M sub-regions, and calculating regional color values of the M sub-regions according to the color data information of each pixel in each sub-region;

carrying out weighted average operation on the regional color values of the M sub- regions to obtain a color value of the lamp bank; and generating the light control signal according to the color value of the lamp bank;

wherein the carrying out weighted average operation on the regional color values of the M sub-regions to obtain a color value of the lamp bank comprises:

using a normal distribution function or a triangle function to set weights each corresponding one of the sub-regions of the edge region, so that the weight corresponding to the sub-region in the middle of the edge region is larger, and the weights corresponding to the sub-regions of the edge region on both sides are smaller; and carrying out the weighted average operation on the regional color values of the M sub-regions according to the set weights to obtain the color value of the lamp bank;

wherein, the light control method further comprises:

acquiring a service voltage of a power supply;

generating a brightness control signal according to the service voltage; and outputting the brightness control signal to the lamp bank to control a brightness of the lamp bank.

2. The light control method of claim 1, wherein the video data information is a high definition multimedia interface (HDMI) video information or a video graphics array (VGA) video information; and the obtaining color data information of pixels in a preset region in a frame picture according to the video data information comprises:

converting the video data information into a USB Video Class (UVC) video data information; and obtaining the color data information of the pixels in the preset region in the frame picture according to the UVC video data information.

3. The light control method of claim 1, further comprising:

acquiring a sound signal;

generating a rhythm control signal according to the sound signal; and outputting the rhythm control signal to the lamp bank to control the operating state of the lamp bank to match the sound signal.

4. The light control method of claim 3, wherein:

the acquiring a sound signal comprises:

acquiring a sound signal collected from a microphone; and the generating a rhythm control signal according to the sound signal comprises:

acquiring a first signal point in the sound signal satisfying a specific frequency requirement; and generating the rhythm control signal for controlling flashing of the lamp bank according to the first signal point.

5. The light control method of claim 1, further comprising:

acquiring a service voltage of a power supply;

generating a brightness control signal according to the service voltage; and outputting the brightness control signal to the lamp bank to control a brightness of the lamp bank.

6. The light control method of claim 1, wherein the lamp bank is selected from a group consisting of:

a lamp strip arranged around a back of a display screen;

a lamp strip arranged around an edge of an indoor ceiling;

a lamp strip arranged around an edge of a floor; and a vertical lamp strip.

7. The light control method of claim 3, wherein the generating a rhythm control signal according to the sound signal comprises:

acquiring a second signal point in the sound signal satisfying a specific amplitude requirement; and generating the rhythm control signal for controlling the brightness of the lamp bank according to the second signal point.

8. A light control apparatus applied to a light controller, wherein the light controller is in communication with a video source device and a lamp bank respectively, and the apparatus comprises:

a video information acquisition module, configured for acquiring video data information from the video source device;

a color information calculation module, configured for obtaining color data information of pixels in a preset region in a frame picture according to the video data information, wherein the preset region is an edge region of the frame picture, and the edge region comprises an upper edge region and/or a lower edge region, and a left edge region and/or a right edge region;

a control signal generation module, configured for generating a corresponding light control signal according to the color data information; and an output module, configured for outputting the light control signal to the lamp bank to control an operating state of the lamp bank to match the video data information;

wherein, the generating the corresponding light control signal according to the color data information comprises:

dividing the edge region of the frame picture into M sub-regions, and calculating regional color values of the M sub-regions according to the color data information of each pixel in each sub-region;

carrying out weighted average operation on the regional color values of the M sub- regions to obtain a color value of the lamp bank; and generating the light control signal according to the color value of the lamp bank;

wherein the carrying out weighted average operation on the regional color values of the M sub-regions to obtain a color value of the lamp bank comprises:

using a normal distribution function or a triangle function to set weights each corresponding one of the sub-regions of the edge region, so that the weight corresponding to the sub-region in the middle of the edge region is larger, and the weights corresponding to the sub-regions of the edge region on both sides are smaller; and carrying out the weighted average operation on the regional color values of the M sub-regions according to the set weights to obtain the color value of the lamp bank;

wherein, the control signal generation module is further configured for:

acquiring a service voltage of a power supply;

generating a brightness control signal according to the service voltage; and outputting the brightness control signal to the lamp bank to control a brightness of the lamp bank.

9. A computer-readable storage medium storing a computer-executable instruction, wherein the program instruction, when executed by a processor, causes the processor to perform a light control method comprising:

acquiring video data information from the video source device;

obtaining color data information of pixels in a preset region in a frame picture according to the video data information, wherein the preset region is an edge region of the frame picture, and the edge region comprises an upper edge region and/or a lower edge region, and a left edge region and/or a right edge region;

generating a corresponding light control signal according to the color data information; and outputting the light control signal to a lamp bank to control an operating state of the lamp bank to match the video data information;

generating a corresponding light control signal according to the color data information; and outputting the light control signal to the lamp bank to control an operating state of the lamp bank to match the video data information;

wherein, the generating the corresponding light control signal according to the color data information comprises:

dividing the edge region of the frame picture into M sub-regions, and calculating regional color values of the M sub-regions according to the color data information of each pixel in each sub-region;

carrying out weighted average operation on the regional color values of the M sub-regions to obtain a color value of the lamp bank; and generating the light control signal according to the color value of the lamp bank;

wherein the carrying out weighted average operation on the regional color values of the M sub-regions to obtain a color value of the lamp bank comprises:

using a normal distribution function or a triangle function to set weights each corresponding one of the sub-regions of the edge region, so that the weight corresponding to the sub-region in the middle of the edge region is larger, and the weights corresponding to the sub-regions of the edge region on both sides are smaller; and carrying out the weighted average operation on the regional color values of the M sub-regions according to the set weights to obtain the color value of the lamp bank;

wherein, the light control method further comprises:

acquiring a service voltage of a power supply;

generating a brightness control signal according to the service voltage; and outputting the brightness control signal to the lamp bank to control a brightness of the lamp bank.

* * * * *